United States Patent
van Houweling

(10) Patent No.: US 7,621,549 B2
(45) Date of Patent: Nov. 24, 2009

(54) BICYCLE LIGHT SYSTEM

(75) Inventor: Erik van Houweling, Heerde (NL)

(73) Assignee: Trek Bicycle Corporation, Waterloo, WI (US)

( * ) Notice: Subject to any disclaimer, the term of this patent is extended or adjusted under 35 U.S.C. 154(b) by 219 days.

(21) Appl. No.: 11/736,334

(22) Filed: Apr. 17, 2007

(65) Prior Publication Data

US 2008/0023934 A1 Jan. 31, 2008

Related U.S. Application Data

(60) Provisional application No. 60/833,351, filed on Jul. 26, 2006.

(51) Int. Cl.
B62K 17/00 (2006.01)
(52) U.S. Cl. .................... 280/288.4; 362/473; 280/276; 280/279
(58) Field of Classification Search ............. 280/288.4, 280/276, 279; 180/219; 224/447; 362/473, 362/475, 476; D12/118
See application file for complete search history.

(56) References Cited

U.S. PATENT DOCUMENTS

| 2,788,763 | A | * | 4/1957 | Ries ............................ 116/56 |
| 3,878,387 | A | | 4/1975 | Kovacic |
| 4,088,882 | A | | 5/1978 | Lewis |
| 4,099,222 | A | * | 7/1978 | Cornell et al. .............. 362/473 |
| 4,204,191 | A | | 5/1980 | Daniels |
| 4,319,307 | A | | 3/1982 | Turner |
| 4,819,135 | A | | 4/1989 | Padilla et al. |
| 4,901,209 | A | | 2/1990 | Nitz |
| 5,008,782 | A | | 4/1991 | Murray |
| 5,526,240 | A | | 6/1996 | Kuo |
| 5,653,007 | A | | 8/1997 | Boyer et al. |
| 5,823,653 | A | | 10/1998 | Elam, Jr. et al. |
| 5,908,200 | A | | 6/1999 | Stewart |
| 6,336,736 | B1 | | 1/2002 | Edmond |
| 6,607,185 | B2 | | 8/2003 | Graves et al. |
| D479,163 | S | | 9/2003 | Graves et al. |
| 6,779,913 | B2 | | 8/2004 | Niezrecki et al. |
| 6,799,872 | B2 | * | 10/2004 | Kawai ........................ 362/473 |
| 6,805,473 | B2 | | 10/2004 | Beard |
| 6,863,425 | B2 | | 3/2005 | Hatfield, Jr. |
| 6,997,584 | B1 | | 2/2006 | Rothan et al. |
| 7,001,051 | B2 | | 2/2006 | Palmer et al. |
| 7,073,807 | B2 | * | 7/2006 | Masui ........................ 280/276 |
| 7,264,076 | B2 | * | 9/2007 | Grigg et al. ................. 180/219 |
| 2002/0163817 | A1 | | 11/2002 | Bukowsky |
| 2006/0103107 | A1 | | 5/2006 | Masui |

FOREIGN PATENT DOCUMENTS

BE 429 079 8/1938

* cited by examiner

*Primary Examiner*—Tony H. Winner
(74) *Attorney, Agent, or Firm*—Boyle Fredrickson, S.C.

(57) ABSTRACT

A bicycle fork assembly includes a steering tube configured and arranged to be rotatably mounted to a front part of a frame of a bicycle. A fork crown is secured to a lower end of the steering tube and includes first and second arms that extend laterally in opposite directions from the center portion. First and second suspension systems are secured to the arms of the fork crown and a lighting system is integrated into at least one of the first and second suspension systems. The lighting system preferably includes two lights that are configured such that the respective light beams overlap to provide a single operating beam to illuminate a travel path.

21 Claims, 5 Drawing Sheets

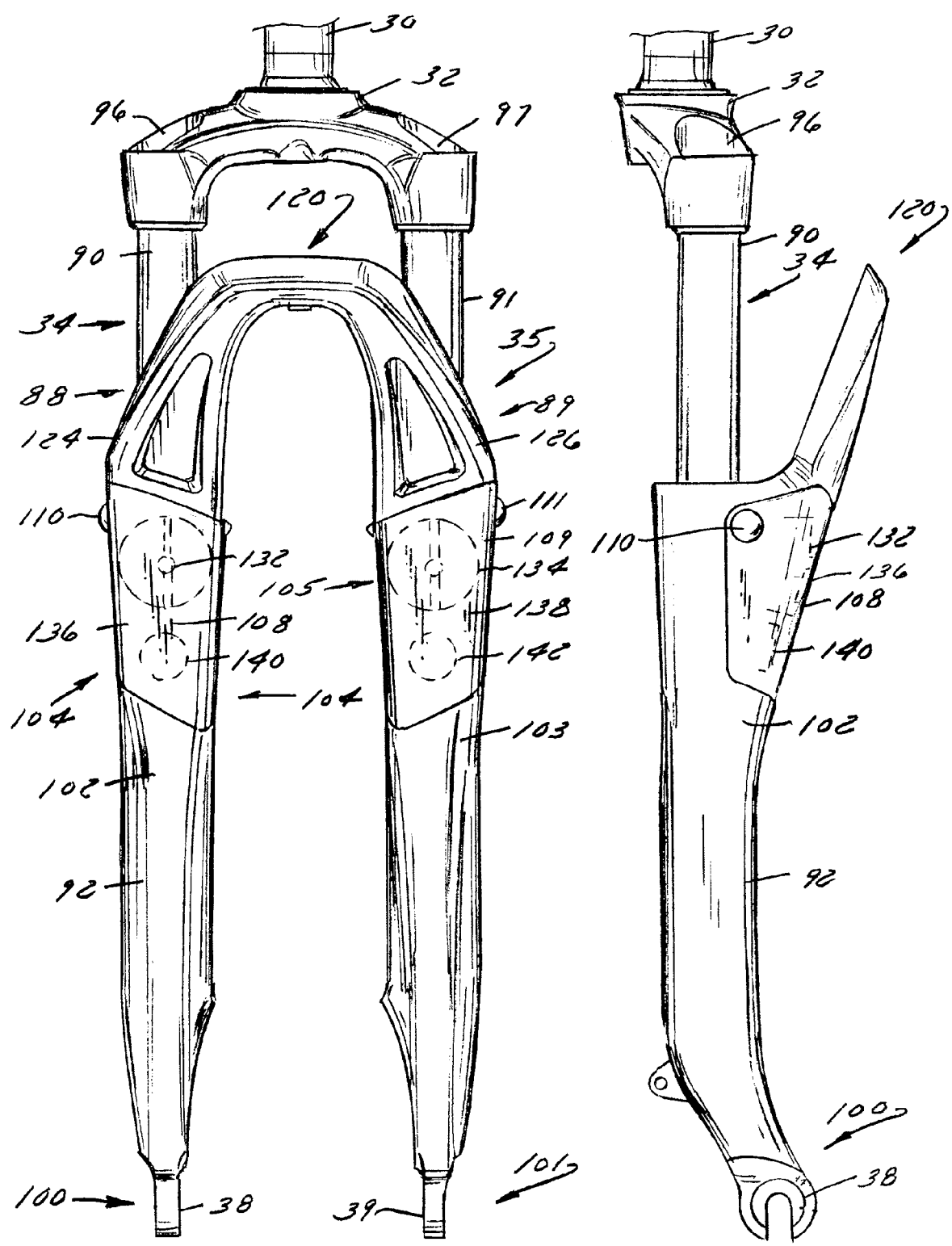

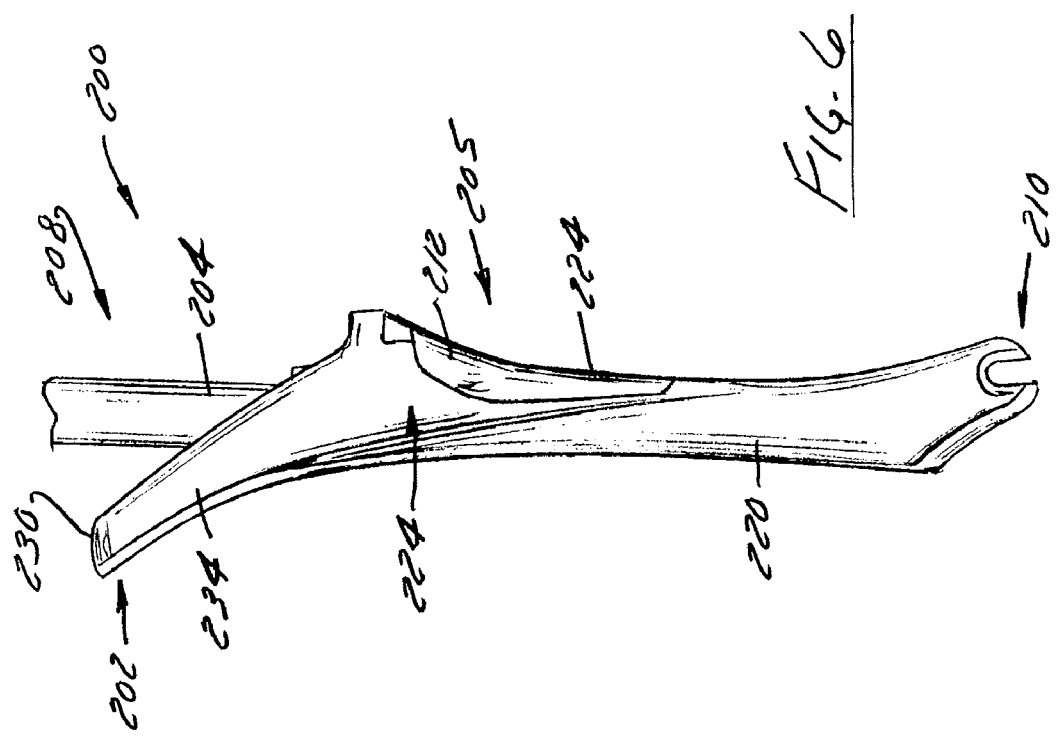
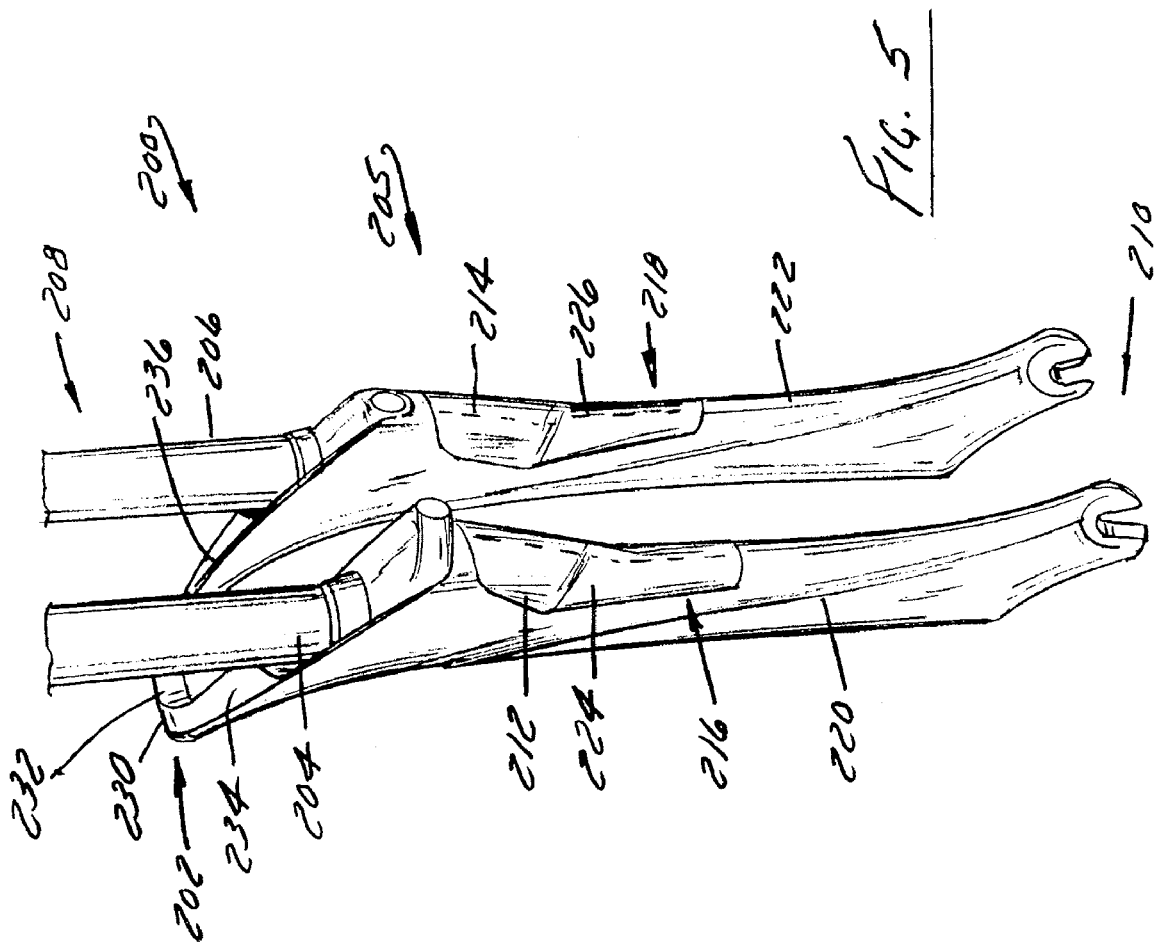

BICYCLE LIGHT SYSTEM

CROSS-REFERENCE TO RELATED APPLICATION

This application claims priority to U.S. Provision Application Ser. No. 60/833,351 filed on Jul. 26, 2006 and titled "Bicycle Fork Light", the disclosure of which is incorporated herein.

BACKGROUND OF THE INVENTION

1. Field of the Invention

The present invention relates to a bicycle light system and, more specifically, to a bicycle light and fork system constructed to integrate headlights into a bicycle.

2. Discussion of the Related Art

Over the recent past, the market has witnessed a profound consumer interest in recreational bicycles. The consequence of this popularity of bicycle riding has been a growing presence of bicycle operators or cyclists, of all ages, on public roads or off road trails. Further, as the recreation has grown, typical bicycle excursions or trips have lengthened in extent and, concomitantly a great variety of lighter, multi-geared and faster bicycles have entered the marketplace. Increasingly, bicycle trips are made at later hours and for extended distances, to the extent that riders now are frequently encountered on the highways or trails at dusk and into nightfall. Twenty-four hour off road races or night rides are not uncommon. The safety aspects involved with such night riding are apparent and the necessity for providing a good light source has assumed considerable importance.

Whether the bicycle is used for recreation, transportation or competition, the bicycle industry is constantly improving the various components of the bicycle in order to keep up with the rising consumer interest. One component that has been extensively redesigned is the bicycle suspension fork. Suspension forks are widely used in bicycle front forks in recent years. When the bicycle travels on a path having rough surfaces, the suspension fork prevents vibrations from being transmitted to the rider thereby enabling a comfortable ride. While improvements have been made to the fork design and suspension systems, little, if any improvements have been made in providing an illumination device integrated into a fork. An illumination device, such as a front lamp, that can be integrated into the front fork is therefore desirable.

Heretofore, lighting systems for bicycles have been designed more under ornamental considerations than under criteria meeting the actual operational needs of the cyclist. At the present, the cyclist uses either a headlamp or lights crudely mounted to the frame of the bicycle to illuminate a travel path of the bicycle. Most of these illumination devices often require a battery power source. The addition of the battery power source increases the weight and bulk characteristics of the illumination system. Such attributes detract from the lightweight design attributes of modern bicycle structures. Bicycle driven generators are also commonly used, but must be driven by the operator, thus requiring acquiring additional rider exertion to operate the illumination system. Further, generators are motion and speed dependent, thus rendering such lights inoperative or ineffective during low speed, stopping or other operational conditions which are considered hazardous.

Another consideration concerns the unfortunate prevalence of thievery of valuable accessories from bicycles while they remain locked but unattended. More valuable, sophisticated equipment mounted upon a bicycle cannot be left unattended. The removal of such equipment for short periods wherein the bicycle is locked but unattended represents an operational inconvenience of magnitude rendering the use or purchase of more expensive but quality equipment somewhat impractical.

In view of the above, it will be apparent to those skilled in the art that there exists a need for an improved bicycle fork assembly that includes a light source that is lightweight, easily mounted, and secure.

SUMMARY OF THE INVENTION

The present invention discloses bicycle fork and light assemblies and a method of forming a bicycle that overcomes the aforementioned drawbacks. One aspect of the present invention discloses a bicycle fork assembly that includes a steering tube configured and arranged to be rotatably mounted to a front part of a frame of a bicycle. A fork crown is secured to a lower end of the steering tube and includes first and second arms that extend laterally in opposite directions from the center portion. First and second suspension systems are secured to the arms of the fork crown and a lighting system is integrated into at least one of the first and second suspension systems. The lighting system preferably includes two lights that are configured such that the respective light beams overlap to provide a single operating beam to illuminate a travel path.

Another aspect of the invention is to provide a bicycle fork assembly that includes a light system that is lightweight, easily mounted, and secure. A further aspect of the invention is to enable integrating the light assembly on a bicycle suspension fork assembly without significantly increasing the number, complexity, or assemblage of component parts.

Consistent with the foregoing aspects, and in accordance with the invention as embodied and broadly described herein, a bicycle suspension fork assembly is disclosed in suitable detail to enable one of ordinary skill in the art to make and use the invention. A bicycle fork assembly according to another aspect of the invention is disclosed that includes a fork crown having a center portion for being secured to a steering tube. A first arm and a second arm extend in opposite directions from the fork crown. A brake arch extends between a first and a second suspension system which are each secured to a respective arm of the fork crown. A lighting system is integrated into at least one of the first and second suspension systems for illuminating a bicycle travel path.

A bicycle light system according to a further aspect of the invention includes a first suspension fork and a second suspension fork. Each suspension fork has a first member and a second member movably attached to the first member. The first and second suspension forks are oriented to support a wheel therebetween. The light system includes a first light that is attached to the first suspension fork and a second light that is attached to the second suspension fork. The first light and the second light are oriented such that light generated by the first and second lights is aligned to form a common beam.

Another aspect of the invention discloses a method of forming a bicycle. The method includes the steps of providing a frame, a fork crown, and a pair of shock absorbing forks. The frame has a head tube for receiving a steer tube and the fork crown is constructed for being operationally attached to the steer tube. The pair of shock absorbing forks is constructed for extending from the fork crown and connecting a wheel to the bicycle. The method includes forming a light housing constructed to be attached to the pair of shock absorbing forks such that the light housing moves with the pair of shock absorbing forks during operation of the bicycle.

These and other aspects and features of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 3 is a front elevational view of the assembly shown in FIG. 2.

FIG. 4 is a side elevational view of the assembly shown in FIG. 3.

FIG. 5 is a perspective view of another embodiment of a fork and light assembly according to the present invention.

FIG. 6 is a side elevational view of the assembly shown in FIG. 6.

Figure 1:
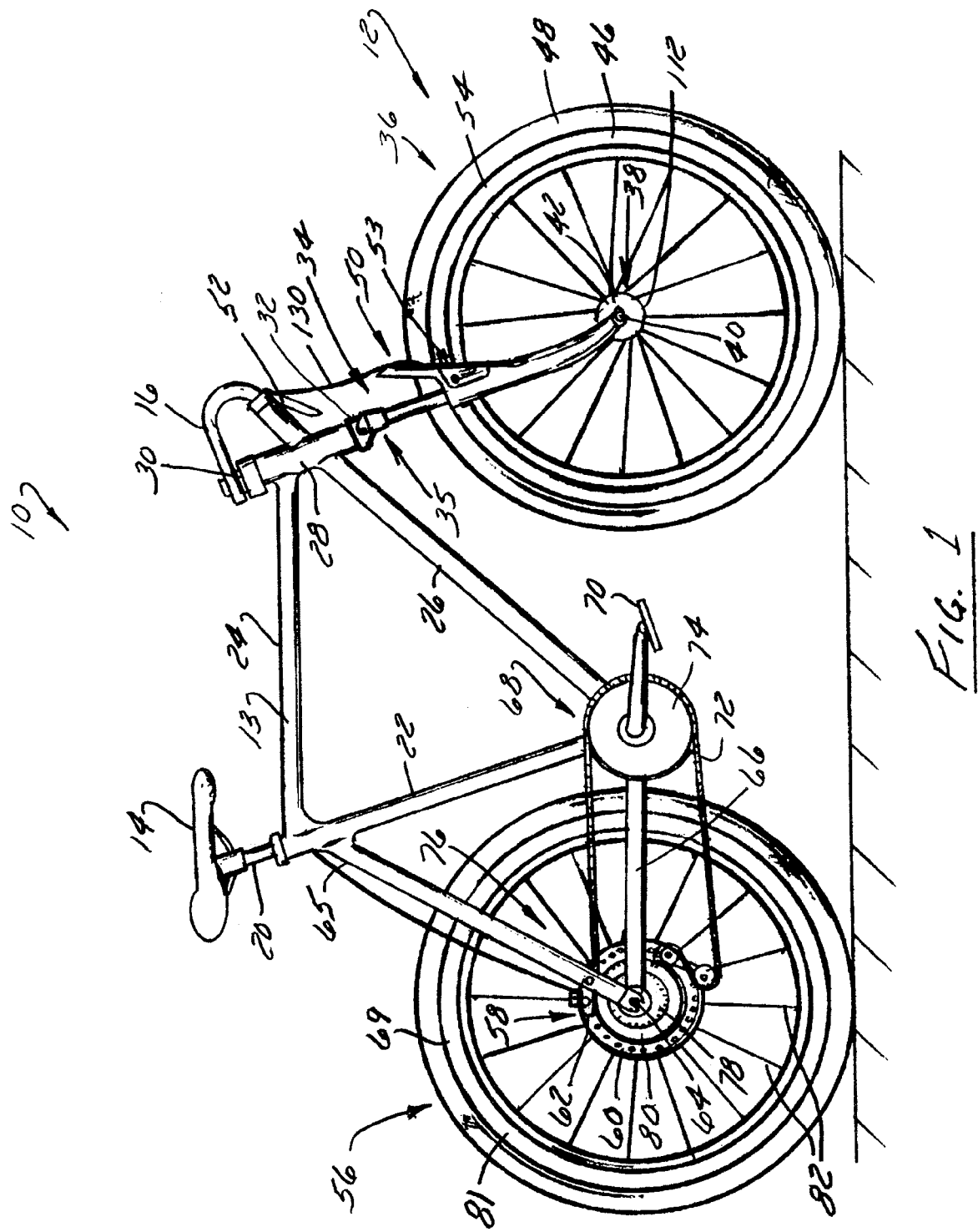
FIG. 1 is an elevation of view of a bicycle equipped with a fork and light assembly according to the present invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected", "attached", or terms similar thereto are often used. They are not limited to direct connection but include connection through other elements where such connection is recognized as being equivalent by those skilled in the art. The present invention and the various features and advantageous details thereof are explained more fully with reference to the non-limiting embodiments described in detail in the following description.

DETAILED DESCRIPTION

FIG. 1 shows a bicycle 10 equipped with a fork and light assembly 12 according to the present invention. Bicycle 10 includes a frame 13 having a seat 14 and handlebars 16 attached thereto. A seat post 20 is connected to seat 14 and slidably engages a seat tube 22 of frame 13. A top tube 24 and a down tube 26 extend forwardly from seat tube 22 to a head tube 28 of frame 13. Handlebars 16 are connected to a stem 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 16 and a pair of brake pads 53 positioned on generally opposite sides of front wheel assembly 36. Brake pads 53 are constructed to engage a brake wall 54 of rim 46 thereby providing a stopping or slowing force to front wheel assembly 36. A rear wheel assembly 56 includes a disc brake assembly 58 having a rotor 60 and a caliper 62 that are positioned proximate a rear axle 64. A rear wheel 69 is positioned generally concentrically about rear axle 64. Understandably, front wheel assembly 36 and rear wheel assembly 56 could be equipped with a brake assembly generally similar to front brake assembly 50 or disc brake assembly 58.

A seat stay 65 and a chain stay 66 offset rear axle 64 from a crankset 68. Crankset 68 includes a pedal 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 of rear wheel 69. A number of spokes 82 extend radially between hub 80 and a rim 81 of rear wheel 69 of rear wheel assembly 56. As is commonly understood, rider operation of pedals 70 drives chain 72 thereby driving rear wheel 69 which in turn propels the rider of bicycle 10. Fork and light assembly 12 is configured and constructed to illuminate a travel path of bicycle 10 during non-daylight hours.

Figure 2:
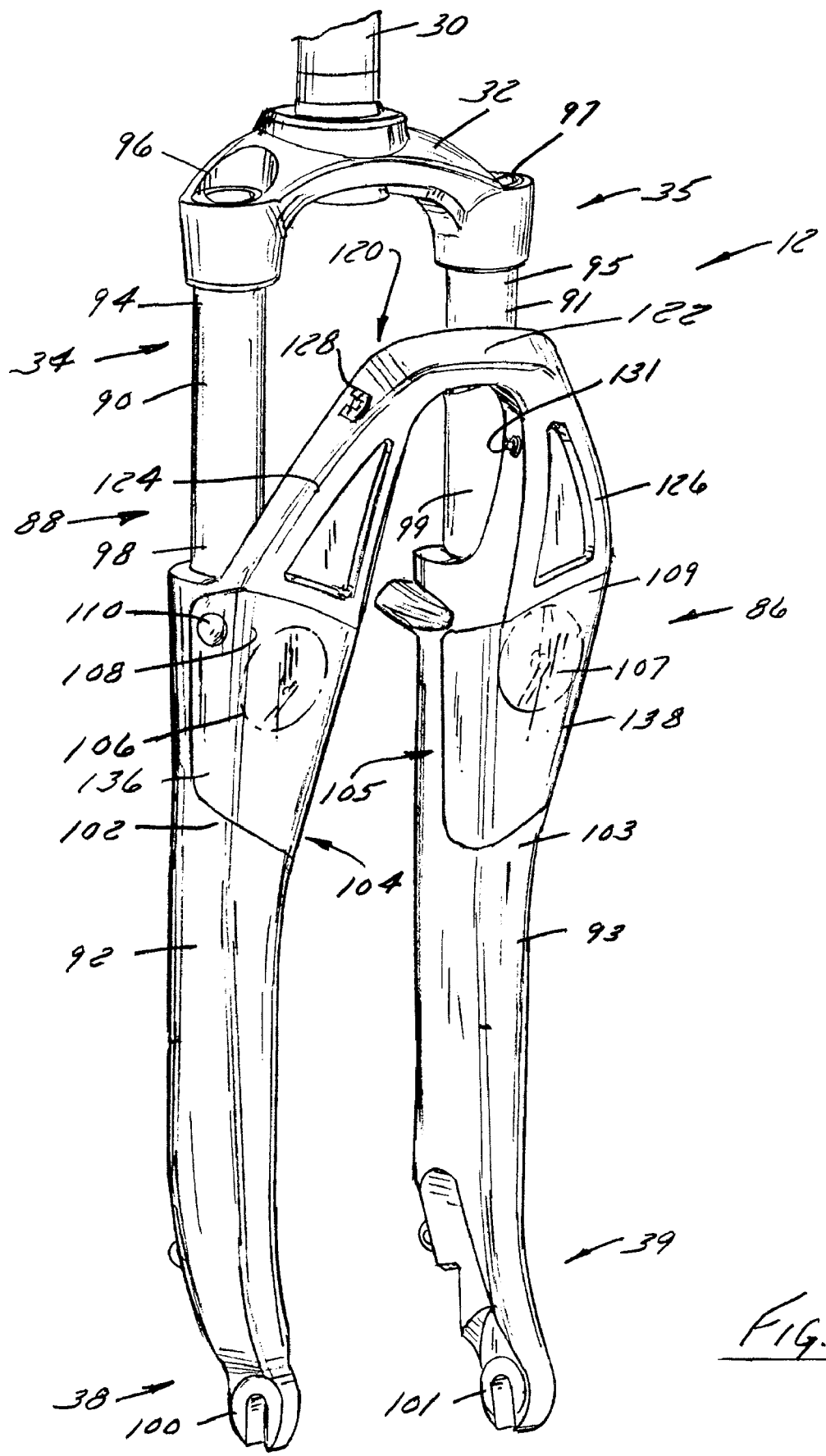
FIG. 2 is a perspective view of a fork area of the bicycle shown in FIG. 1 with the wheel removed therefrom.

As shown in FIGS. 2-4, fork and light assembly 12 provides a light system 86 that is integrally provided with a suspension type fork system 88. Each fork 34, 35 include a first member 90, 91 and a second member 92, 93. A first end 94, 95 of each first member 90, 91 is fixedly attached to a respective sides 96, 97 of fork crown 32. A second end 98, 99 of each first member 90, 91 is slidably engaged with second member 92, 93 such that first members 90, 91 translate into second members 92, 93 thereby allowing fork system 88 to absorb vibrations and impacts associated with operation of bicycle 10. A dampening mechanism 84, such as a hydraulic system, pneumatic system, coil spring or rubber, or a combination thereof, is disposed between each of first member 90, 91 and second member 92, 93. Dampening mechanism 84 is constructed to operate independent of the operation of light system 86. That is, operation of the suspension of fork system 88 and light system 86 are independent and non-interfering.

Fork tips 38, 39 are positioned at an end 100, 101 of second members 92, 93 generally opposite the end of second members 92, 93 engaged with first members 90, 91. Fork tips 38, 39 are constructed to engage front wheel assembly 36 to secure the wheel to bicycle 10 between forks 34, 35. Impacts experienced by wheel assembly 36 are arrested by dampening mechanism 84 and thereby hindered from passing to a rider.

Each of second members 92, 93 includes a body 102, 103 having a cavity 104, 105 formed therein. A light unit 106, 107 is positioned within each of cavities 104, 105. A lens 108, 109 is positioned over each light unit 106, 107 and has a contour that generally matches the contour of body 102, 103 of forks 34, 35, respectively. Preferably, a switch 110 is operatively connected to at least one of light units 106, 107 and is constructed to allow an operator to selectively operate light units 106, 107. Understandably, both of light units 106, 107 can be controlled by manipulation of a single switch 110, or, as shown in FIG. 3, each light unit 106, 107 could be provided with a respective switch 110, 111 to allow independent operation of each light unit 106, 107. In those applications where light units 106, 107 are controlled by a single switch 110, light units 106, 107 may be either hardwired or configured for wireless communication such that operation of one light unit is communicated to and/or controls operation of the second light unit. Such an orientation reduces the operator action required to control operation of both light units 106, 107 of light system 86.

Momentarily referring back to FIG. 1, a power source 112, such as generator or other dynamo, is connected to front wheel assembly 36 such that rotation of the wheel generates the electrical power necessary to power light units 106, 107. Understandably, power source 112 could be either of a hub orientated generator or a generator positioned proximate hub 42. Alternatively, as shown in FIG. 3, other power sources are envisioned, such as batteries 140, 142 or the like, that could be contained within either or both of cavities 104, 105. Yet a further alternative would be a combination type system that includes both a battery and a generator. Such a configuration could also include the electrical systems necessary such that the generator system would replenish the battery system during operation of the bicycle and allow operation of light units 106, 107 when bicycle 10 is stationary or moving at a speed where power source 112 cannot generate sufficient energy to power the light units 106, 107.

Referring back to FIGS. 2-4, a connecting web, or brake arch 120 extends between bodies 102, 103 of forks 34, 35. Brake arch 120 is generally U-shaped and includes a bent top section 122 and two generally angled lower sections 124, 126 is integrally connected to bodies 102, 103 of second members 92, 93. Brake arch 120 is configured to extend in front of forks 34, 35 with respect to a direction of travel or away from bicycle frame 13. Top section 122 may include a brake cable stop 128 constructed to engage a brake cable 130 as shown in FIG. 1. The lower sections 124, 126 may include a brake post 131 for attaching brake assembly 50 thereto. Understandably, brake assembly 50 may be provided as any of a number of known brake configurations such as a cable pull brake, rim brakes, or the like. Preferably, brake arch 120 is integral with lower sections 124, 126 however, brake arch 120 and the lower sections 124, 126 may be removably attached using any of a number of fastening schemes such as mechanical connectors or adhesive systems.

As shown best in FIGS. 3 and 4, each light unit 106, 107 includes an illumination means or light source 132, 134 disposed behind each respective lens 108, 109. Preferably, lens 108, 109 sealingly engage body 102, 103 to prevent dirt, moisture, or debris from interfering with the operation of light sources 132, 134. Understandably, light sources 132, 134 may be any of a variety of light emitting devices such as incandescent or fluorescent light bulbs or LED's. Light sources 132, 134 are secured to a mounting unit 136, 138 that is constructed to be received in cavities 104, 105 of forks 34, 35. Preferably, each lens 108, 109 is constructed to snap-fittingly engage mounting unit 136, 138 to allow convenient axis to light source 132, 134. Understandably, a fastener could also be provided to secure lens 108, 109 to the respective fork 34, 35. An optional battery 140, 142 is provided for powering light sources 132, 134 and configured to be removably disposed behind lens 108, 109.

FIGS. 5 and 6 show an alternate embodiment of a fork and light assembly 200 according to the present invention. The construction and operation of fork and light assembly 200 is generally similar to the construction and operation of fork and light assembly 12. Assembly 200 includes a suspension fork system 202 and a light system 205. Fork system 202 includes a first telescopic fork 204 and a second telescopic fork 206 that are constructed to be connected at an upper end 208 by a fork crown (not shown) and operatively engage a wheel assembly at a lower end 210 thereof. Light system 205 includes a first light unit 212 and a second light unit 214 that are each constructed to be snuggly received within a cavity 216, 218 formed in a body 220, 222 of each of forks 204, 206. A lens 224, 226 is engaged with each fork 204, 206 about each light unit 212, 214 and is contoured to generally match the contour of the respective body 220, 222. Light units 212, 214 can be configured to operate on battery power, generator power, or a combination of battery and generator power. Additionally, light units 212, 214 can be configured to operate with fluorescent, halogen, LED lights, or any combination thereof. Furthermore, it is appreciated that light units 212, 214 may be controlled by a single or individual control switches.

A connecting web or brake arch 230 connects the respective sides of fork and light assembly 200. Brake arch 230 is generally U-shaped and includes a bent section 232 and a pair of side sections 234, 236 that extend from generally opposite ends of the bent section 232 and connects bodies 220, 222 across the space between forks 204, 206. Brake arch 230 may also include the structure necessary for connecting a brake caliper and a brake cable to fork and light assembly 200. Most notably, brake arch 230 extends rearward of forks 204, 206 relative to a direction of travel of a bicycle so equipped. Alternatively, the rearward directing extension of arch 230 allows for the engagement of other brake systems with the wheel at the location forward of forks 204, 206.

Figure 7:
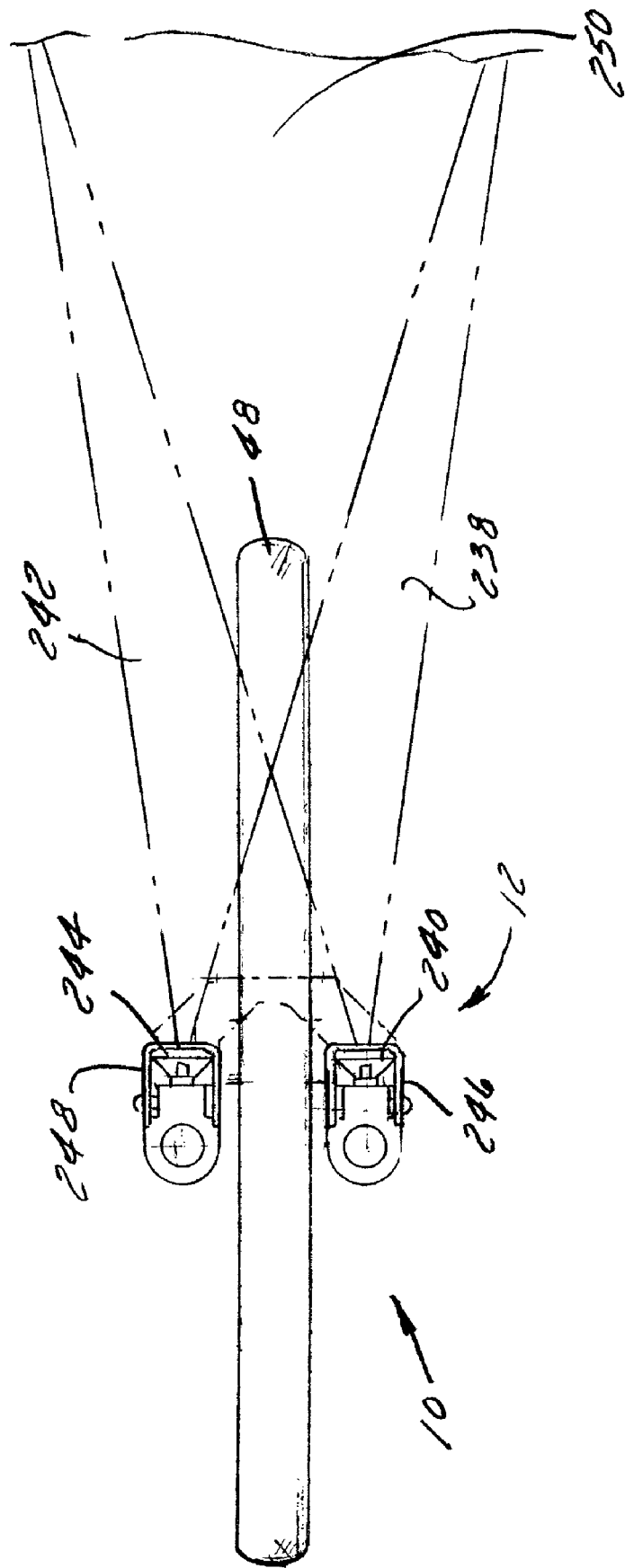
FIG. 7 is a plan view showing operation of the light assembly according to either of the embodiments.

FIG. 7 shows a graphical representation of the operation of either of light systems 86, 205. As shown in FIG. 7, a light beam 238 generated by a first light source 240 substantially overlies a light beam 242 generated by a second light source 244. Lens 246, 248 are configured to disperse the light generated by light sources 240, 244 into a relatively unitary beam 250 such that both light sources 240, 244 cooperate to substantially illuminate a travel path of bicycle 10. Even during turning, light sources 240, 244 substantially illuminate a travel path of bicycle 10 in that, as the rider manipulates the handlebars to turn the front wheel, the lights, being supported on the forks, are directed in the intended direction. Such a system provides a bicycle that is operable regardless of lighting conditions and enhances safety by maintaining the shining of the lights in the direction of travel and generating a relative unitary beam of light from a pair of light sources. A fork and light assembly according to the present invention further enhances safety in providing a redundancy in the lighting system that even if one light burns out or is otherwise rendered inoperable; the other light unit may still illuminate a travel path. Accordingly, the present invention discloses a bicycle fork and light assembly that can enhance the operation and enjoyment derived from such a vehicle.

A bicycle fork assembly according to one embodiment of the invention includes a fork crown that has a center portion for being secured to a steering tube. A first arm and a second arm extend in opposite directions from the fork crown. A brake arch extends between a first and a second suspension system which are each secured to a respective arm of the fork crown. A lighting system is integrated into at least one of the first and second suspension systems for illuminating a bicycle travel path.

A bicycle light system according to another embodiment of the invention includes a first suspension fork and a second suspension fork. Each suspension fork has a first member and a second member movably attached to the first member. The first and second suspension forks are oriented to support a wheel therebetween. The light system includes a first light that is attached to the first suspension fork and a second light that is attached to the second suspension fork. The first light and the second light are oriented such that light generated by the first and second lights is aligned to form a common beam.

Another embodiment of the invention is directed to a method of forming a bicycle that includes providing a frame, a fork crown, and a pair of shock absorbing forks. The frame has a head tube for receiving a steer tube and the fork crown is constructed for being operationally attached to the steer tube. The pair of shock absorbing forks is constructed for extending from the fork crown and connecting a wheel to the bicycle. The method includes forming a light housing constructed to be attached to the pair of shock absorbing forks such that the light housing moves with the pair of shock absorbing forks during operation of the bicycle.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept. Moreover, as noted throughout the application, the individual components need not be formed in the disclosed shapes, or assembled in the disclosed configuration, but could be provided in virtually any shape, and assembled in virtually any configuration, so as to provide for a front fork with integrated lights. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A bicycle fork assembly comprising:
    a fork crown having a center portion for being secured to a steering tube;
    a first arm and a second arm extending in opposite directions from the fork crown;
    a first and a second suspension system secured to the first and second arms, respectively;
    a brake arch extending between the first and second suspension systems; and
    a lighting system integrated into and supported by at least one of the first and second suspension systems, the lighting system being laterally offset from a portion of the brake arch that is between the first and second suspension systems and oriented to generally overlie the one of the first and second suspension systems.

2. The bicycle fork assembly of claim 1 wherein each of the first and second suspension systems includes an upper leg extending from the fork crown and a lower leg for engaging the upper leg such that the upper leg can move axially therein.

3. The bicycle fork assembly of claim 2 wherein the lighting system includes a pair of lights wherein each light is integrated into a respective lower leg.

4. The bicycle fork assembly of claim 3 wherein each lower leg includes a cavity formed therein, each cavity being constructed to receive a respective light.

5. The bicycle fork assembly of claim 4 further comprising a lens constructed to engage the lower leg over the cavity for enclosing the respective light therein.

6. The bicycle fork assembly of claim 3 wherein the pair of lights are connected to each other by a wire or remote signal such that operation of one light controls operation of the other light.

7. The bicycle fork assembly of claim 1 wherein the lighting system includes a first light attached to the first suspension system and a second light attached to the second suspension system such that a light beam generated by the first light substantially overlies a light beam generated by the second light.

8. A bicycle light system comprising:
    a first suspension fork and a second suspension fork, each suspension fork having a first member and a second member movably attached to the first member, the first and second suspension forks being oriented to support a wheel therebetween; and
    a first light attached to the first suspension fork and a second light attached to the second suspension fork; the first light and the second light oriented such that light generated by the first and second lights is aligned to form a common beam.

9. The bicycle light system of claim 8 further comprising a brake bridge extending between the first suspension fork and the second suspension fork.

10. The bicycle light system of claim 9 wherein the brake bridge is either in front of or behind the suspension forks with respect to a bicycle travel direction.

11. The bicycle light system of claim 8 further comprising a cavity formed in each of the suspension forks configured to receive a respective light therein.

12. The bicycle light system of claim 11 further comprising a cover constructed to enclose the cavity.

13. The bicycle light system of claim 8 wherein the first light and the second light are operatively connected such that an operating instruction communicated to the first light is also communicated to the second light.

14. The bicycle light system of claim 13 wherein communication of the operating instruction between the first light and the second light is performed with one of a wire connection and a wireless connection.

15. The bicycle light system of claim 8 further comprising a fork crown connected to each of the first and second suspension forks and constructed to engage a steer tube.

16. A method of forming a bicycle comprising:
    providing a frame having a head tube for receiving a steer tube;
    providing a fork crown for engaging the steer tube;
    providing a pair of shock absorbing forks for extending from the fork crown and connecting a wheel to the bicycle; and
    forming each of a pair of light housings for attachment to the pair of shock absorbing forks such that each of the light housings moves with the pair of shock absorbing forks during operation of the bicycle and so that each light housing generally overlies a respective shock absorbing fork.

17. The method of claim 16 further comprising forming a cavity in each of the pair of light housings shaped to accommodate a light generating devices.

18. The method of claim 17 wherein each of light generating devices is further defined as an incandescent light, a fluorescent light, a halogen light, or an LED.

19. The method of claim 17 further comprising aligning light generated by each light generating devices to generate a light beam.

20. The method of claim 17 further comprising operationally connecting each light generating device with one of a wired connection or a wireless connection.

21. A bicycle fork assembly comprising:
- a fork crown having a center portion for being secured to a steering tube;
- a first arm and a second arm extending in opposite directions from the fork crown;
- a first and a second suspension system secured to the first and second arms, respectively, each of the first and second suspension systems including an upper leg extending from the fork crown and a lower leg for engaging the upper leg such that the upper leg can move axially therein;
- a brake arch extending between the first and second suspension systems; and
- a lighting system including a pair of lights wherein each light is integrated into a respective lower leg of one of the first and second suspension systems.

* * * * *